US012680400B2

(12) United States Patent
Zhou et al.

(10) Patent No.: US 12,680,400 B2
(45) Date of Patent: Jul. 14, 2026

(54) FLUID LOSS CONTROL ADDITIVES FOR DRILLING FLUIDS

(71) Applicant: Halliburton Energy Services, Inc., Houston, TX (US)

(72) Inventors: Hui Zhou, Houston, TX (US); Jay Deville, Houston, TX (US); Preston Andrew May, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/629,270

(22) Filed: Apr. 8, 2024

(65) Prior Publication Data

US 2025/0314141 A1     Oct. 9, 2025

(51) Int. Cl.
*E21B 21/00* (2006.01)
*C09K 8/12* (2006.01)
(52) U.S. Cl.
CPC .............. *E21B 21/003* (2013.01); *C09K 8/12* (2013.01)
(58) Field of Classification Search
None
See application file for complete search history.

(56) References Cited

U.S. PATENT DOCUMENTS

| | | | |
|---|---|---|---|
| 10,336,850 | B2 | 7/2019 | Zha et al. |
| 10,858,566 | B2 | 12/2020 | Favero et al. |
| 10,883,037 | B2 | 1/2021 | Zhou et al. |
| 10,968,380 | B2 | 4/2021 | Panamarathupalayam |
| 11,746,275 | B2 | 9/2023 | Linscombe |
| 2015/0191640 | A1 | 7/2015 | Lee et al. |
| 2017/0198189 | A1 | 7/2017 | Panamarathupalayam |
| 2017/0369617 | A1* | 12/2017 | Zha ........................ C08F 222/10 |
| 2019/0127627 | A1* | 5/2019 | Zhou ........................ E21B 21/06 |
| 2022/0340803 | A1 | 10/2022 | Eyaa Allogo et al. |
| 2023/0357622 | A1 | 11/2023 | Linscombe |

* cited by examiner

*Primary Examiner* — Andrew Sue-Ako
(74) *Attorney, Agent, or Firm* — The Hilton Firm PLLC

(57) ABSTRACT

Drilling fluids for drilling a wellbore. An example drilling fluid includes an aqueous base fluid, a first fluid loss control additive that is a cross-linked polymer comprising N-vinylpyrrolidone as a monomer, and a second fluid loss control additive that is a cross-linked copolymer comprising a first comonomer of 2-acrylamido-2-methylpropanesulfonic acid in a first comonomer concentration of at least 50 mol % of the copolymer. The second fluid loss control additive additionally includes a second comonomer of an N-vinyl amine-containing monomer, a terminal double bond-containing monomer, or a combination of an N-vinyl amine-containing monomer and a terminal double bond-containing monomer. The second comonomer is present in a total second comonomer concentration of 50 mol % or less of the copolymer.

10 Claims, 2 Drawing Sheets

FLUID LOSS CONTROL ADDITIVES FOR DRILLING FLUIDS

TECHNICAL FIELD

The present disclosure relates generally to wellbore operations, and more particularly, to the use of a fluid loss control additive with a drilling fluid to improve compatibility of the formed filter cake with subsequently introduced zinc-containing brines.

BACKGROUND

Natural resources such as gas, oil, and water residing in a subterranean formation may be recovered by drilling a wellbore down to the subterranean formation while circulating a drilling fluid in the wellbore. The drilling fluid may possess various properties that may be beneficial to the drilling of the subterranean formation. For example, the drilling fluid may possess a density sufficient to carry the cuttings of the subterranean formation to the surface. Additionally, the drilling fluid may be used to deposit a filter cake on the walls of the formed wellbore. The drilling fluid contacts the wall of the wellbore and builds up layers of residue on the exterior of the wellbore wall to form the filter cake. The filter cake prevents at least a portion of the drilling fluid from being lost into the subterranean formation, thereby allowing the drilling fluid to continue to circulate in the wellbore.

The deposited filter cake should be maintained to prevent fluid loss. Subsequently introduced fluids may precipitate portions of the filter cake, which may affect its filtration capability. The use of the drilling fluid is an important part of wellbore construction. The present invention provides improved drilling fluids for the drilling of a subterranean formation.

BRIEF DESCRIPTION OF THE DRAWINGS

Illustrative examples of the present disclosure are described in detail below with reference to the attached drawing figures, which are incorporated by reference herein, and wherein.

Figure 1:
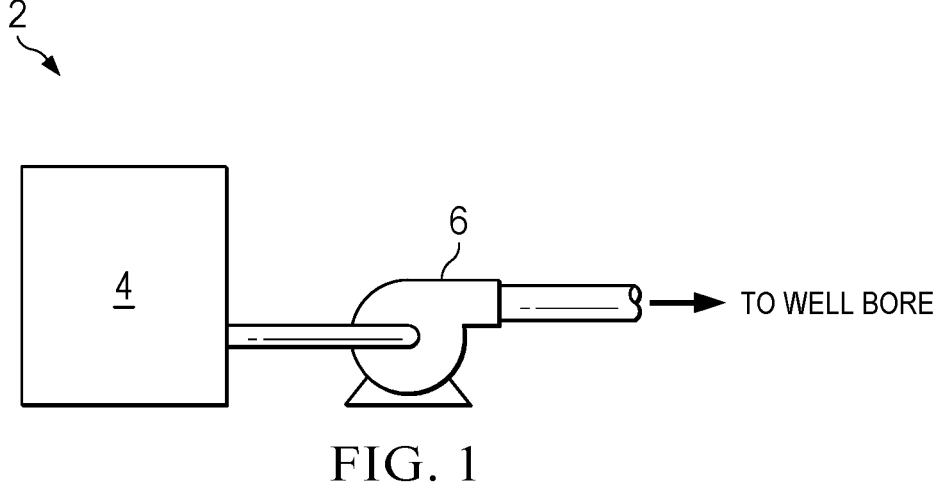
FIG. 1 illustrates a schematic of the preparation of a drilling fluid in accordance with one or more examples described herein.

The illustrated figures are only exemplary and are not intended to assert or imply any limitation with regard to the environment, architecture, design, or process in which different examples may be implemented.

DETAILED DESCRIPTION

The present disclosure relates generally to wellbore operations, and more particularly, to the use of a fluid loss control additive with a drilling fluid to improve compatibility of the formed filter cake with subsequently introduced zinc-containing brines.

In the following detailed description of several illustrative examples, reference is made to the accompanying drawings that form a part hereof, and in which is shown by way of illustration specific examples that may be practiced. These examples are described in sufficient detail to enable those skilled in the art to practice them, and it is to be understood that other examples may be utilized, and that logical structural, mechanical, electrical, and chemical changes may be made without departing from the spirit or scope of the disclosed examples. To avoid detail not necessary to enable those skilled in the art to practice the examples described herein, the description may omit certain information known to those skilled in the art. The following detailed description is, therefore, not to be taken in a limiting sense, and the scope of the illustrative examples are defined only by the appended claims.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The terms uphole and downhole may be used to refer to the location of various components relative to the bottom or end of a well. For example, a first component described as uphole from a second component may be further away from the end of the well than the second component. Similarly, a first component described as being downhole from a second component may be located closer to the end of the well than the second component.

The terms upstream and downstream may be used to refer to the location of various components relative to one another in regards to the flow of a sample through said components. For example, a first component described as upstream from a second component will encounter a sample before the downstream second component encounters the sample. Similarly, a first component described as being downstream from a second component will encounter the sample after the upstream second component encounters the sample.

The present disclosure relates generally to wellbore operations, and more particularly, to the use of a fluid loss control additive with a drilling fluid to improve compatibility of the filter cake with subsequently introduced zinc-containing brines. Advantageously, the drilling fluids are prepared with two fluid loss control additives. The first fluid loss control additive may be used to increase viscosity and provide fluid loss control to the drilling fluid. The second fluid loss control additive may be used to maintain fluid loss control during the introduction of subsequently introduced zinc-containing brines by improving the compatibility of the filter cake with the zinc-containing brines. The zinc-containing brines may be introduced into the wellbore after the introduction of the drilling fluid. These zinc-containing brines may be used as screen-running fluids and/or gravel packing fluids. As such, filtration control may be maintained even during the use of subsequently introduced zinc-containing brines. As a further advantage, the second fluid loss control additive introduces a manageable level of rheology and is compatible with many existing drilling fluid formulations.

The drilling fluids comprise a first fluid loss control additive. The first fluid loss control additive may be used in the drilling fluid to provide the dual functionalities of a viscosifier and a fluid loss control additive. The first fluid loss control additive is a cross-linked polymer having N-vinylpyrrolidone as a monomer. In some examples, the first fluid control additive is a homopolymer of cross-linked polyvinylpyrrolidone. In some alternative examples, the first fluid loss control additive is a copolymer comprising an additional monomer(s) selected from the group including, but not limited to, acrylamide, N-substituted acrylamides (such as 2-acrylamido-2-methylpropanesulfonic acid (AMPS), N-ethylacrylamide, N-isopropylacrylamide, N,N-dimethylacrylamide, N-hydroxyethylacrylamide, and dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides (such as N-vinylformamide, N-vinylacetamide, and N-methyl-N-vinylacetamide), N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates, allyl sulfonates, vinylimidazole, allylimidazole, allylamine, diallylamine, allyltrimethylammonium halide, diallyldimethylammonium chloride, and diallyldialkylammonium halide, or any combination of additional monomers. If the first fluid loss control additive comprises the additional monomer(s), the additional monomer(s) is (are) present in the first fluid loss control additive polymer in a total concentration of about 10 mol % or less.

The concentration of the first fluid loss control additive in a drilling fluid may range from about 0.1% w/v to about 10% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the first fluid loss control additive in the drilling fluid may range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the first fluid loss control additive in the drilling fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select a first fluid loss control additive having a desirable concentration for use in a given drilling fluid.

The drilling fluids comprise a second fluid loss control additive. The second fluid loss control additive may be used in the drilling fluid to maintain fluid loss control in the presence of subsequently introduced treatment fluids that comprise zinc. For example, a zinc-containing brine may be introduced to the wellbore as a screen running fluid or a gravel packing fluid. The second fluid loss control additive may maintain the filter cake in the presence of these subsequently introduced zinc-containing brines. The second fluid loss control additive is a cross-linked copolymer having 2-acrylamido-2-methylpropanesulfonic acid as a comonomer in a concentration of 50 mol % or greater. Generally, the second fluid loss control additive additionally comprises at least one second comononer comprising a N-vinyl amine-containing monomer, a terminal double bond-containing monomer, or any combination of an N-vinyl amine-containing monomer and a terminal double bond-containing monomer. More specifically, the second fluid loss control additive comprises at least one additional comonomer selected from the group including, but not limited to, N-vinylpyrrolidone, N-vinylamides (such as N-vinylformamide, N-vinylacetamide, N-vinyl-N-methylacetamide, N-vinylcaprolactam, and N-vinylpiperidone), acrylamide, methacrylamide, N-substituted acrylamides (such as N-methylacrylamide, N-ethylacrylamide, N-isopropylacrylamide, N,N-dimethylacrylamide, N-hydroxyethylacrylamide, and dimethylaminopropyl acrylamide), methacrylamide, N-substituted methacrylamides (such as dimethylaminopropyl methacrylamide), acrylates (such as methyl acrylate and hydroxyethyl acrylate), methacrylates (such as methyl methacrylate, 2-hydroxyethyl methacrylate, and 2-dimethylaminoethyl methacrylate), acrylic acid, methacrylic acid, N-vinylamides (such as N-vinylformamide, N-vinylacetamide, and N-methyl-N-vinylacetamide), N-allylamides, vinyl alcohol, vinyl ethers (such as vinyl ethyl ether, ethylene glycol monovinyl ether, polyethylene glycol monovinyl ether, and glycerol monovinyl ether), vinyl esters (such as vinyl acetate), allyl alcohol, allyl ethers (such as sodium 3-allyloxy-2-hydroxypropane-1-sulfonate, glycerol monoallyl ether, ethylene glycol monoallyl ether, and polyethylene glycol monoallyl ether), allyl esters (such as allyl acetate), vinylpyridine, vinyl sulfonates (such as sodium vinylsulfonate), allyl sulfonates, vinylimidazole, allylimidazole, allylamine, allyltrimethylammonium halide, diallylamine, diallyldimethylammonium chloride, and diallyldialkylammonium halide, or any combination of additional monomers. The second comonomer or comonomers are present in the second fluid loss control additive copolymer in a total second comonomer concentration of 50 mol % or less.

The concentration of the second fluid loss control additive in a drilling fluid may range from about 0.1% w/v to about 10% w/v. The concentration may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the second fluid loss control additive in the drilling fluid may range from about 0.1% (w/v) to about 10% (w/v), from about 0.5% (w/v) to about 10% (w/v), from about 1% (w/v) to about 10% (w/v), from about 2% (w/v) to about 10% (w/v), from about 3% (w/v) to about 10% (w/v), from about 4% (w/v) to about 10% (w/v), from about 5% (w/v) to about 10% (w/v), from about 6% (w/v) to about 10% (w/v), from about 7% (w/v) to about 10% (w/v), from about 8% (w/v) to about 10% (w/v), or from about 9% (w/v) to about 10% (w/v). As another example, the concentration of the second fluid loss control additive in the drilling fluid may range from about 0.1% (w/v) to about 10% (w/v), from about 0.1% (w/v) to about 9% (w/v), from about 0.1% (w/v) to about 8% (w/v), from about 0.1% (w/v) to about 7% (w/v), from about 0.1% (w/v) to about 6% (w/v), from about 0.1% (w/v) to about 5% (w/v), from about 0.1% (w/v) to about 4% (w/v), from about 0.1% (w/v) to about 3% (w/v), from about 0.1% (w/v) to about 2% (w/v), from about 0.1% (w/v) to about 1% (w/v), or from about 0.1% (w/v) to about 0.5% (w/v). With the benefit of this disclosure, one of ordinary skill in the art will be readily able to prepare and select a second fluid loss control additive having a desirable concentration for use in a given drilling fluid.

The first fluid loss control additive and the second fluid loss control additive comprise one or more crosslinkers. Examples of the cross-linkers may include, but are not limited to, acrylamide-based crosslinkers, acrylate-based crosslinkers, ester-based crosslinkers, amide-based cross-linkers, any derivatives thereof, and any combinations thereof. In certain examples, the acrylamide-based cross-linkers may be monomers with at least one acrylamide or methacrylamide group, which may also contain additional unsaturated groups such as vinyl, allyl, and/or acetylenic groups. In certain examples, the acrylate-based crosslinkers may be monomers with at least one acrylate or methacrylate group, which may also contain additional unsaturated groups such as vinyl, allyl, and/or acetylenic groups. These crosslinkers may be used alone or in combination with one or more additional crosslinkers, including but not limited to, divinyl ether, diallyl ether, vinyl or allyl ethers of polygly-cols or polyols (such as pentaerythritol allyl ether (PAE), allyl sucrose, ethylene glycol divinyl ether, triethylene gly-col divinyl ether, diethylene glycol divinyl ether, glycerol diallyl ether, polyethylene glycol divinyl ether, propylene glycol divinyl ether, and trimethylolpropane diallyl ether), divinylbenzene, 1,3-divinylimidazolidin-2-one (also known as 1,3-divinylethyleneurea or divinylimidazolidone), divi-nyltetrahydropyrimidin-2(1H)-one, dienes (such as 1,7-oc-tadiene and 1,9-decadiene), triallyl amine and tetraallylam-monium derivatives (such as triallylamine, triallyl alkylammonium halide, tetraallylammonium halide, and tet-raallylethylene diamine), N-vinyl-3(E)-ethylidene pyrroli-done, ethylidene bis(N-vinylpyrrolidone), and any combi-nation of crosslinkers.

Specific examples of acrylamide-based crosslinkers may also include, but are not limited to, N,N'-methylenebisacry-lamide, N,N'-methylenebismethacrylamide, N,N'-ethylen-ebisacrylamide, N,N'-(1,2-dihydroxyethylene)bisacrylam-ide, 1,4-diacryloylpiperazine, N,N-diallylacrylamide, and 1,3,5-triacryloylhexahydro-1,3,5-triazine, and any combina-tion of crosslinkers. Specific examples of acrylate-based crosslinkers may also include, but are not limited to, ethyl-ene glycol di(meth)acrylate, propylene glycol di(meth)acry-late, diethylene glycol di(meth)acrylate, polyethylene glycol di(meth)acrylate, 1,4-butanediol di(meth)acrylate, 1,6-hexanediol di(meth)acrylate, 1,1,1-trimethylolpropane trimethacrylate, pentaerythritol tri(meth)acrylate, pen-taerythritol tetra(meth)acrylate, glycerol di(meth)acrylate, glycerol tri(meth)acrylate, triglycerol di(meth)acrylate, allyl (meth)acrylate, vinyl (meth)acrylate, tris [2-(acryloyloxy) ethyl] isocyanurate, and any combination of crosslinkers. Specific examples of ester-based and amide-based cross-linkers may also include, but are not limited to, vinyl or allyl esters (such as diallyl carbonate, divinyl adipate, divinyl sebacate, diallyl phthalate, diallyl maleate, diallyl succi-nate), 1,3,5-triallyl-1,3-5-triazine-2,4,6 (1H,3H,5H)-trione, and triallyl cyanurate, and any combination of crosslinkers. The crosslinker may be present in the first fluid loss control additive and/or second fluid loss control additive in a concentration of about 0.05 mol % to about 15 mol % of the total monomeric units of the polymer(s).

The first fluid loss control additive and/or second fluid loss control additive may be provided in the form of a dry powder or in the form of a water-in-oil emulsion, which may then be used, for example, to formulate a drilling fluid for use in a drilling operation. In the case of a water-in-oil emulsion, the first fluid loss control additive and/or second fluid loss control additive may comprise a microgel dis-persed in a continuous oil phase.

The first fluid loss control additive and/or second fluid loss control additive may provide desirable viscosity and fluid-loss control under well circulating conditions at tem-peratures of up to 260° C. (500° F.). In addition, the first fluid loss control additive and/or second fluid loss control additive may provide such desirable rheological properties without the need of clay being included in the drilling fluid.

The drilling fluids described herein comprise an aqueous base fluid, for example, freshwater, saltwater (e.g., water containing one or more salts dissolved therein), brine (e.g., saturated saltwater, including saturated saltwater produced from subterranean formations), seawater, or any combina-tion thereof. Generally, the aqueous base fluid may be from any source provided that the aqueous base fluid does not contain an excess of compounds that may undesirably affect other components in the treatment fluid. In the case of brines, the aqueous base fluid may comprise a monovalent brine or a divalent brine. Suitable monovalent brines may include, for example, sodium chloride brines, sodium bro-mide brines, potassium chloride brines, potassium bromide brines, and the like. Suitable divalent brines can include, for example, magnesium chloride brines, calcium chloride brines, calcium bromide brines, zinc bromide brines, and the like. One of ordinary skill in the art, with the benefit of this disclosure, should be readily able to select an aqueous base fluid for a chosen application.

The concentration of the aqueous base fluid in the drilling fluid may range from about 1% (w/v) to about 99% (w/v). The concentration of the aqueous base fluid in the drilling fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the con-centration of the aqueous base fluid in the drilling fluid may range from about 1% (w/v) to about 99% (w/v), from about 7                                                                                        8

5% (w/v) to about 99% (w/v), from about 10% (w/v) to about 99% (w/v), from about 15% (w/v) to about 99% (w/v), from about 20% (w/v) to about 99% (w/v), from about 25% (w/v) to about 99% (w/v), from about 30% (w/v) to about 99% (w/v), from about 35% (w/v) to about 99% (w/v), from about 40% (w/v) to about 99% (w/v), from about 45% (w/v) to about 99% (w/v), from about 55% (w/v) to about 99% (w/v), from about 60% (w/v) to about 99% (w/v), from about 65% (w/v) to about 99% (w/v), from about 70% (w/v) to about 99% (w/v), from about 75% (w/v) to about 99% (w/v), from about 80% (w/v) to about 99% (w/v), from about 85% (w/v) to about 99% (w/v), from about 90% (w/v) to about 99% (w/v), or from about 95% (w/v) to about 99% (w/v). As another example, the concentration of the aqueous base fluid in the drilling fluid may range from about 1% (w/v) to about 99% (w/v), from about 1% (w/v) to about 95% (w/v), from about 1% (w/v) to about 90% (w/v), from about 1% (w/v) to about 85% (w/v), from about 1% (w/v) to about 80% (w/v), from about 1% (w/v) to about 75% (w/v), from about 1% (w/v) to about 70% (w/v), from about 1% (w/v) to about 65% (w/v), from about 1% (w/v) to about 60% (w/v), from about 1% (w/v) to about 55% (w/v), from about 1% (w/v) to about 50% (w/v), from about 1% (w/v) to about 45% (w/v), from about 1% (w/v) to about 40% (w/v), from about 1% (w/v) to about 35% (w/v), from about 1% (w/v) to about 30% (w/v), from about 1% (w/v) to about 25% (w/v), from about 1% (w/v) to about 20% (w/v), from about 1% (w/v) to about 15% (w/v), from about 1% (w/v) to about 10% (w/v), or from about 1% (w/v) to about 5% (w/v). With the benefit of this disclosure, one of ordinary skill in the art will be able to prepare a treatment fluid having a sufficient concentration of an aqueous base fluid for a given application.

One or more dissolved salts may also be included in the drilling fluids. Where used, the dissolved salt may be included in the drilling fluid for many purposes, including, but not limited to, densifying a drilling fluid to a chosen density. A mixture of one or more dissolved salts may be used in some instances. Suitable dissolved salts may include monovalent and divalent salts, which may be used, for example, to form monovalent or divalent brines. Mixtures of monovalent and divalent salts may also be used. Suitable monovalent salts may include, but are not limited to, sodium chloride, sodium bromide, potassium bromide, potassium chloride, lithium chloride, sodium formate, potassium formate, cesium formate, and mixtures thereof among others. Suitable divalent salts may include, but are not limited to, calcium bromide, zinc bromide, calcium chloride, manganese bromide, manganese chloride, zinc chloride, calcium nitrate, calcium iodide, and mixtures thereof. In some examples, polyvalent salts may be included in the drilling fluid. An example of a suitable polyvalent salt is cerium nitrate.

Some examples of the drilling fluids may also include weighting agents to increase the density of the drilling fluids. By way of example, weighting agents may have a specific gravity of about 2 or higher (e.g., about 2, about 4, etc.). Suitable weighting agents may include, but are not limited to, calcium carbonate, magnesium carbonate, iron carbonate, hematite, ilmenite, hausmannite, barite, manganese tetroxide, or combinations thereof.

In some optional examples, the drilling fluids may further comprise an additive. The additive may be used to adjust a property of the drilling fluid, for example, viscosity, density, etc. Examples of the additives include, but are not limited to, silica scale control additives, corrosion inhibitors, surfactants, gel stabilizers, anti-oxidants, polymer degradation prevention additives, relative permeability modifiers, scale inhibitors, iron control agents, particulate diverters, salts, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, hydrate inhibitors, consolidating agents, bactericides, clay stabilizers, breakers, delayed release breakers, the like, or any combination thereof. With the benefit of this disclosure, one of ordinary skill in the art and the benefit of this disclosure will be able to formulate a drilling fluid having properties suitable for a desired application.

The drilling fluids have a density suitable for a particular application. By way of example, the drilling fluids may have a density in a range of from about 9 pounds per gallon ("lb/gal") to about 20 lb/gal, in a range of from about 12 lb/gal to about 20 lb/gal, or in a range of from about 14 lb/gal to about 20 lb/gal. With the benefit of this disclosure, those of ordinary skill in the art will readily recognize the appropriate density of a drilling fluid for a particular application.

Subsequent to the introduction of the drilling fluids disclosed herein, a brine comprising zinc may be introduced into the wellbore. The zinc-containing brine may be introduced as a treatment fluid for a variety of wellbore operations including, but not limited to, a screen running fluid and/or a gravel packing fluid. The zinc-containing brine may have a density of 14.5 lb/gal to about 20 lb/gal in some examples. In some examples, the zinc content in the zinc-containing brine may range from about 3 wt. % to about 55 wt. % and encompassing any value(s) in between. Screen running fluids may be used after the well is drilled. The drilling fluid is first displaced or modified to be a low/no solids drilling fluid. Then one or more sand screens may be introduced into the wellbore with the screen running fluid. The screen running fluid is used to place the sand screens at a desired location. The screen running fluid may be heavier than the drilling fluid (e.g., 0.3-0.5 lb/gal more) and is used after the drilling fluid. The screen running fluid is preferred to be solids free, but may comprise solids for adjustment of the density and/or viscosity. A gravel packing fluid may be used to deliver sized sand that may act as a filter medium between the subterranean formation and a sand screen. The sand screens may be run alone (e.g., as with a standalone screen) or with the gravel depending on the well.

FIG. 1 illustrates a schematic of the preparation of a drilling fluid in accordance with the examples disclosed herein. A system 2 is used for the preparation of a drilling fluid and the delivery of the drilling fluid to a wellbore. As shown, the drilling fluid may be prepared by mixing an aqueous base fluid, a first fluid loss control additive, and a second fluid loss control additive in mixing equipment 4, which may be a jet mixer, re-circulating mixer, or a batch mixer. The drilling fluid may then be pumped via pumping equipment 6 to the wellbore. In some examples, the mixing equipment 4 and the pumping equipment 6 may be disposed on one or more mixing trucks as will be apparent to those of ordinary skill in the art. In some examples, a jet mixer may be used, for example, to continuously mix the first fluid loss control additive and the second fluid loss control additive with the aqueous base fluid as it is being pumped into the wellbore.

It should be clearly understood that the example system illustrated by FIG. 1 is merely a general application of the principles of this disclosure in practice, and a wide variety of other examples are possible. Therefore, the scope of this disclosure is not limited in any manner to the details of FIG. 1 as described herein.

Figure 2:
FIG. 2 illustrates a schematic of a drilling assembly in which a drilling fluid is used in accordance with one or more examples described herein.

FIG. 2 illustrates a schematic of a drilling assembly 100 in which a drilling fluid 122 as disclosed above may be used. It should be noted that while FIG. 2 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create a wellbore 116 that penetrates various subterranean formations 118. In an embodiment, the drill bit 114 may penetrate reservoir section 136 and a drilling fluid 122, as disclosed herein, may be circulated in the wellbore 116 during the drilling of the reservoir section 136.

The drilling fluid 122 comprises an aqueous base fluid, a first fluid loss control additive, and a second fluid loss control additive to enhance the formation of a filter cake on the wall of the wellbore 116. A pump 120 (e.g., a mud pump) may circulate the drilling fluid 122 through a feed pipe 124 and to the kelly 110, which conveys the drilling fluid 122 downhole through the interior of the drill string 108 and through one or more orifices in the drill bit 114 and into the wellbore 116 portion penetrating the reservoir section 136. The drilling fluid 122 may then be circulated back to the surface via an annulus 126 defined between the drill string 108 and the walls of the wellbore 116. As the drilling fluid 122 is circulated in the annulus 126, the first fluid loss control additive and the second fluid loss control additive may form a filter cake on the walls of the wellbore 116 to prevent the loss of the fluid portion of the drilling fluid 122 to the surrounding subterranean formation 118. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid 122.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more drilling fluid additives may be added to the drilling fluid 122 via a mixing hopper 134 communicably coupled to or otherwise in fluid communication with the retention pit 132. In some examples, the drilling fluid additives comprise additional amounts of the first and/or second fluid loss control additives that may be added to the foamed drilling fluid 122 via the mixing hopper. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 2 shows only a single retention pit 132, there could be more than one retention pit 132, such as multiple retention pits 132 in series. Moreover, the retention pit 132 may be representative of one or more fluid storage facilities and/or units where the drilling fluid additives may be stored, reconditioned, and/or regulated until added to the drilling fluid 122.

After the introduction of the drilling fluid 122, a brine comprising zinc may be introduced into the wellbore 116. The zinc-containing brine may be used as screen running fluid or a gravel packing fluid. The zinc-containing brine may contact the filter cake formed by the drilling fluid 122. Due to the presence of the second fluid loss control additive in the formed filter cake, the filter cake may maintain its filtration control capability in the presence of the zinc-containing brine.

It should be clearly understood that the example system illustrated by FIG. 2 is merely a general application of the principles of this disclosure in practice, and a wide variety of other examples are possible. Therefore, the scope of this disclosure is not limited in any manner to the details of FIG. 2 as described herein.

In some alternative examples, the first or second fluid loss control additive could be added to a completion brine instead of or in addition to the drilling fluid. In some additional alternative examples, the first or second fluid loss control additive could be added to the drilling fluid as a nanoparticle. The nanoparticle could comprise a core-shell morphology where the core could be an inorganic material and the shell could be comprised of the first or second fluid loss control additive. The inorganic material that makes up the core could be an oxide including, but not limited to, titanium oxide, silicon oxide, calcium oxide, iron oxide, or any combination of materials.

To facilitate a better understanding of the present embodiments, the following examples of certain aspects of some embodiments are given. In no way should the following examples be read to limit, or define, the entire scope of the embodiments.

Examples

An experiment was conducted to evaluate the effect of the second fluid loss control additive on the zinc tolerance of a drilling fluid. Two additional fluid loss control additives were added to a drilling fluid formulation comprising the first fluid loss control additive as described herein, and as shown in Table 1. The second fluid loss control additive is a crosslinked copolymer of 2-acrylamido-2-propanesulfonic (AMPS) and N-vinylpyrrolidone (NVP) as disclosed herein. A comparative fluid loss control additive was also tested and its efficacy was measured and compared to the efficacy of the second fluid loss control additive. The comparative fluid loss control additive is a linear terpolymer of AMPS, NVP, and acrylamide and was not cross-linked like the second fluid loss control additive. After mixing, the drilling fluid was hot-rolled at 350° F. for 16 hours. Fluid rheology was measured before and after hot-rolling at 120° F. with a Fann™ Model 45 viscometer. Filter cake of the hot-rolled fluid was then built on a 12-micron ceramic disk at 500 psi differential pressure and 350° F. for 16 hours. The filtrate was collected in a graduated cylinder and recorded as the initial fluid loss without multiplying the volume by 2. After the filter cake was built up, the cell was cooled down to room temperature and the remaining drilling fluid was poured out. After that, 100 mL of a $ZnBr_2/CaBr_2$ brine, having a density of 15.2 lb/gal, was added into the cell without disturbing the filter cake. The cell was heated back to 350° F. and the filtrate was collected again at 500 psi differential pressure for up to 16 hours. The volume of the filtrate was recorded as the final fluid loss without multiplying the volume by 2.

TABLE 1

| Drilling Fluids with Additional Fluid Loss Control Additives (FLA) | | | | | | |
|---|---|---|---|---|---|---|
| HTHP Drill-in Fluids | #1 (baseline) | | #2 | | #3 | |
| 14.2 lb/gal CaBr$_2$ brine (bbl) | 0.886 | | 0.886 | | 0.886 | |
| Defoamer (lb/bbl) | 0.2 | | 0.2 | | 0.2 | |
| First Fluid Loss Control Additive (lb/bbl) | 8.5 | | 8.5 | | 8.5 | |
| Second Fluid Loss Control Additive (lb/bbl) | — | | 8.0 | | — | |
| Comparative Fluid Loss Control Additive (lb/bbl) | — | | — | | 8.0 | |
| Alkalinity Agent (lb/bbl) | 4.0 | | 4.0 | | 4.0 | |
| Bridging Agent 1(lb/bbl) | 23.0 | | 23.0 | | 23.0 | |
| Bridging Agent 2(lb/bbl) | 69.0 | | 69.0 | | 69.0 | |
| Magnesium Peroxide (lb/bbl) | 1.0 | | 1.0 | | 1.0 | |
| Oxygen Scavenger 1 (lb/bbl) | 0.1 | | 0.1 | | 0.1 | |
| Oxygen Scavenger 2 (lb/bbl) | 0.5 | | 0.5 | | 0.5 | |
| Hot-roll at 350° F. for 16 hours | | | | | | |
| Fluid Rheology @ 120° F. | BHR | AHR | BHR | AHR | BHR | AHR |
| 600 rpm | 82 | 79 | 131 | 146 | 96 | 124 |
| 300 rpm | 54 | 53 | 85 | 97 | 62 | 80 |
| 200 rpm | 44 | 42 | 66 | 76 | 49 | 62 |
| 100 rpm | 32 | 30 | 44 | 53 | 34 | 41 |
| 6 rpm | 12 | 11 | 15 | 14 | 14 | 8 |
| 3 rpm | 10 | 10 | 13 | 12 | 12 | 6 |
| 10 sec gel (lb/100 ft$^2$) | 11 | 10 | 13 | 6 | 12 | 6 |
| 10 min gel (lb/100 ft$^2$) | 11 | 11 | 26 | 9 | 14 | 13 |
| Plastic Viscosity (cp) | 28 | 26 | 46 | 49 | 34 | 44 |
| Yield Point (lb/100 ft$^2$) | 26 | 27 | 39 | 48 | 28 | 36 |
| Initial fluid loss after building filter cake at 350° F. for 16 hours | | | | | | |
| Drilling fluid filtrate @ 350° F. (mL) | 25.0 | | 0 | | 3.0 | |
| Final fluid loss with 15.2 lb/gal ZnBr$_2$/CaBr$_2$ brine on top of filter cake at 350° F. | | | | | | |
| Drilling fluid filtrate @ 350° F. (mL) | >50/20 minutes | | 3.0/2 hours 23.0/16 hours | | 3.5/2 hours >50/4 hours | |

BHR: Before hot-rolling;
AHR: After hot-rolling

As shown in Table 1, both the second fluid loss control additive and comparative fluid loss control additive reduced the initial fluid loss significantly from about 25 mL down to 0-3 mL. When the zinc-containing brine was added on top of the filter cake, the baseline fluid (#1) quickly lost its filtration control, with final fluid loss higher than 50 mL within 20 minutes. The comparative fluid loss control additive, which was the linear polymer, was able to control the final fluid loss in the first 2 hours, but quickly lost fluid loss control after that. The second fluid loss control additive, which was the crosslinked polymer, showed good filtration control even after 16 hours (23 mL).

Table 2 shows the drilling fluid with adjusted amount of polymers. Again, the second fluid loss control additive significantly reduced the initial fluid loss down to about 1.5 mL even at 4.0 lb/bbl. When the zinc-containing brine was added, the best results were observed when the second fluid loss control additive was present in a concentration of at least 6.0 lb/bbl.

TABLE 2

| HTHP Drill-in Fluids with BaraVis W-637 | | | | |
|---|---|---|---|---|
| HTHP Drill-in Fluids | #1 (baseline) | #4 | #5 | #6 |
| 14.2 lb/gal CaBr$_2$ brine (bbl) | 0.886 | 0.886 | 0.886 | 0.886 |
| Defoamer (lb/bbl) | 0.2 | 0.2 | 0.2 | 0.2 |
| First Fluid Loss Control Additive (lb/bbl) | 8.5 | 8.5 | 6.0 | 7.0 |
| Second Fluid Loss Control Additive (lb/bbl) | — | 4.0 | 6.0 | 8.0 |
| Alkalinity Agent (lb/bbl) | 4.0 | 4.0 | 4.0 | 4.0 |
| Bridging Agent 1 (lb/bbl) | 23.0 | 23.0 | 23.0 | 23.0 |
| Bridging Agent 2 (lb/bbl) | 69.0 | 69.0 | 69.0 | 69.0 |
| Magnesium peroxide (lb/bbl) | 1.0 | 1.0 | 1.0 | 1.0 |
| Oxygen Scavenger 1 (lb/bbl) | 0.1 | 0.1 | 0.1 | 0.1 |
| Oxygen Scavenger 2 (lb/bbl) | 0.5 | 0.5 | 0.5 | 0.5 |

TABLE 2-continued

| HTHP Drill-in Fluids | #1 (baseline) | | #4 | | #5 | | #6 | |
|---|---|---|---|---|---|---|---|---|
| | | | Hot-roll at 350° F. for 16 hours | | | | | |
| Fluid Rheology @ 120° F. | BHR | AHR | BHR | AHR | BHR | AHR | BHR | AHR |
| 600 rpm | 82 | 79 | 112 | 113 | 71 | 78 | 92 | 101 |
| 300 rpm | 54 | 53 | 75 | 75 | 44 | 50 | 59 | 64 |
| 200 rpm | 44 | 42 | 60 | 60 | 34 | 39 | 46 | 50 |
| 100 rpm | 32 | 30 | 43 | 41 | 23 | 26 | 31 | 32 |
| 6 rpm | 12 | 11 | 18 | 11 | 8 | 6 | 10 | 7 |
| 3 rpm | 10 | 10 | 17 | 10 | 7 | 5 | 9 | 5 |
| 10 sec gel (lb/100 ft$^2$) | 11 | 10 | 15 | 8 | 8 | 4 | 10 | 4 |
| 10 min gel (lb/100 ft$^2$) | 11 | 11 | 24 | 8 | 16 | 5 | 26 | 7 |
| Plastic Viscosity (cp) | 28 | 26 | 37 | 38 | 27 | 28 | 33 | 37 |
| Yield Point (lb/100 ft$^2$) | 26 | 27 | 38 | 37 | 17 | 22 | 26 | 27 |
| Initial fluid loss after building filter cake at 350° F. for 16 hours | | | | | | | | |
| Drilling Fluid Filtrate @ 350° F. (mL) | 25.0 | | 1.5 | | 1.4 | | 2.5 | |
| Final fluid loss with 15.2 lb/gal ZnBr$_2$/CaBr$_2$ brine on top of the filter cake at 350° F. | | | | | | | | |
| Drilling Fluid Filtrate @ 350° F. (mL) | >50/10 minutes | | >50/2 hours | | 100/19.5 hours | | 30/16 hours | |

The drilling fluids disclosed herein may directly or indirectly affect one or more components or pieces of equipment associated with or which may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Provided are drilling fluids for drilling a wellbore in accordance with the disclosure and the illustrated FIGs. An example drilling fluid comprises an aqueous base fluid, a first fluid loss control additive that is a cross-linked polymer comprising N-vinylpyrrolidone as a monomer, and a second fluid loss control additive that is a cross-linked copolymer comprising a first comonomer of 2-acrylamido-2-methyl-propanesulfonic acid in a first comonomer concentration of at least 50 mol % of the copolymer; wherein the second fluid loss control additive additionally comprises a second comonomer comprising an N-vinyl amine-containing monomer, a terminal double bond-containing monomer, or a combination of an N-vinyl amine-containing monomer and a terminal double bond-containing monomer; wherein the second comonomer is present in a total second comonomer concentration of 50 mol % or less of the copolymer.

Additionally or alternatively, the drilling fluids may include one or more of the following features individually or in combination. The aqueous base fluid may be a divalent brine. The divalent brine may comprise a divalent salt selected from the group consisting of calcium bromide, calcium chloride, calcium nitrate, calcium iodide, and any combination thereof. The first fluid loss control additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The first fluid loss control additive may be a homopolymer of cross-linked polyvinylpyrrolidone. The first fluid loss control additive may be present in the drilling fluid in a concentration of about 0.1% to about 10% w/v of the drilling fluid. The second comonomer of the second fluid loss control additive may be a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination of comonomers. The second fluid loss control additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The second fluid loss control additive may be present in the drilling fluid in a concentration of about 0.1% to about 10% w/v of the drilling fluid. The drilling fluid may have a density of about 9 lb/gal to about 20 lb/gal.

Provided are methods for drilling a wellbore with a drilling fluid in accordance with the disclosure and the illustrated FIGs. An example method comprises providing a drilling fluid comprising an aqueous base fluid, a first fluid loss control additive that is a cross-linked polymer comprising N-vinylpyrrolidone as a monomer, and a second fluid loss control additive that is a cross-linked copolymer comprising a first comonomer of 2-acrylamido-2-methylpropanesulfonic acid in a first comonomer concentration of at least 50 mol % of the copolymer. The second fluid loss control additive additionally comprises a second comonomer comprising an N-vinyl amine-containing monomer, a terminal double bond-containing monomer, or a combination of an N-vinyl amine-containing monomer and a terminal double bond-containing monomer. The second comonomer is present in a total second comonomer concentration of 50 mol % or less of the copolymer The method additionally comprises drilling a wellbore through at least a portion of a subterranean formation with the drilling fluid.

Additionally or alternatively, the method may include one or more of the following features individually or in combination. The method may further comprise introducing a brine into the wellbore after the drilling fluid is introduced into the wellbore; wherein the brine comprises zinc. The zinc-containing brine may be a screen running fluid or a gravel packing fluid. The zinc-containing brine may have a density of about 14 lb/gal to about 20 lb/gal. The subterranean formation may comprise a reservoir comprising a hydrocarbon; wherein the wellbore is drilled through at least a portion of the reservoir; wherein the drilling fluid is circulated in the wellbore during the drilling of the reservoir. The aqueous base fluid may be a divalent brine. The divalent brine may comprise a divalent salt selected from the group consisting of calcium bromide, calcium chloride, calcium nitrate, calcium iodide, and any combination thereof. The first fluid loss control additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The first fluid loss control additive may be a homopolymer of cross-linked polyvinylpyrrolidone. The first fluid loss control additive may be present in the drilling fluid in a concentration of about 0.1% to about 10% w/v of the drilling fluid. The second comonomer of the second fluid loss control additive may be a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination of comonomers. The second fluid loss control additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The second fluid loss control additive may be present in the drilling fluid in a concentration of about 0.1% to about 10% w/v of the drilling fluid. The drilling fluid may have a density of about 9 lb/gal to about 20 lb/gal.

Provided are systems for drilling a wellbore with a drilling fluid in accordance with the disclosure and the illustrated FIGs. An example system comprises a drilling fluid. The drilling fluid comprises an aqueous base fluid, a first fluid loss control additive that is a cross-linked polymer comprising N-vinylpyrrolidone as a monomer, and a second fluid loss control additive that is a cross-linked copolymer comprising a first comonomer of 2-acrylamido-2-methylpropanesulfonic acid in a first comonomer concentration of at least 50 mol % of the copolymer. The second fluid loss control additive additionally comprises a second comonomer comprising an N-vinyl amine-containing monomer, a terminal double bond-containing monomer, or a combination of an N-vinyl amine-containing monomer and a terminal double bond-containing monomer. The second comonomer is present in a total second comonomer concentration of 50 mol % or less of the copolymer. The system further comprises mixing equipment configured to mix the aqueous base fluid, the first fluid loss control additive, and the second fluid loss control additive and pumping equipment configured to pump the drilling fluid in the wellbore.

Additionally or alternatively, the system may include one or more of the following features individually or in combination. The system may further comprise a drill string and a drill bit; wherein the drilling fluid is pumped through the drill string and the drill bit. The aqueous base fluid may be a divalent brine. The divalent brine may comprise a divalent salt selected from the group consisting of calcium bromide, calcium chloride, calcium nitrate, calcium iodide, and any combination thereof. The first fluid loss control additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The first fluid loss control additive may be a homopolymer of cross-linked polyvinylpyrrolidone. The first fluid loss control additive may be present in the drilling fluid in a concentration of about 0.1% to about 10% w/v of the drilling fluid. The second comonomer of the second fluid loss control additive may be a comonomer selected from the group consisting of N-vinylpyrrolidone, N-vinylamides, acrylamide, methacrylamide, N-substituted acrylamides, methacrylamide, N-substituted methacrylamides, acrylates, methacrylates, acrylic acid, methacrylic acid, N-vinylamides, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination of comonomers. The second fluid loss control additive may comprise a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof. The second fluid loss control additive may be present in the drilling fluid in a concentration of about 0.1% to about 10% w/v of the drilling fluid. The drilling fluid may have a density of about 9 lb/gal to about 20 lb/gal.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps. The systems and methods can also "consist essentially of or "consist of the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method for drilling a wellbore in a subterranean formation, the method comprises:
   providing a drilling fluid comprising:
      an aqueous base fluid,
      a first fluid loss control additive that is a cross-linked polymer comprising N-vinylpyrrolidone as a monomer, and a second fluid loss control additive that is a cross-linked copolymer comprising a first comonomer of 2-acrylamido-2-methylpropanesulfonic acid in a first comonomer concentration of at least 70 mol % of the copolymer; wherein the second fluid loss control additive additionally comprises a second comonomer comprising an N-vinyl amine-containing monomer, a terminal double bond-containing monomer, or a combination of an N-vinyl amine-containing monomer and a terminal double bond-containing monomer; wherein the second comonomer is present in a total second comonomer concentration of 30 mol % or less of the copolymer;
   drilling a wellbore through at least a portion of a subterranean formation with the drilling fluid;
   forming a filter cake with the drilling fluid; and
   introducing a brine into the wellbore after the drilling fluid is introduced into the wellbore; wherein the brine comprises zinc, wherein the filter cake is capable of controlling fluid loss of the brine for at least 16 hours.

2. The method of claim 1, wherein the zinc-containing brine is a screen running fluid or a gravel packing fluid.

3. The method of claim 1, wherein the zinc-containing brine has a density of about 14 lb/gal to about 20 lb/gal.

4. The method of claim 1, wherein the subterranean formation comprises a reservoir comprising a hydrocarbon; wherein the wellbore is drilled through at least a portion of the reservoir; wherein the drilling fluid is circulated in the wellbore during the drilling of the reservoir.

5. The method of claim 1, wherein the second comonomer of the second fluid loss control additive is a comonomer selected from the group consisting of N-vinylpyrrolidone, N-vinylamides, acrylamide, methacrylamide, N-substituted acrylamides, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination of comonomers.

6. The method of claim 1, wherein the second fluid loss control additive comprises a crosslinker selected from the group consisting of divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, triallyl amine, triallyl alkylammonium halide, tetraallylammonium halide, tetraallylethylene diamine, N-vinyl-3(E)-ethylidene pyrrolidone, ethylidene bis(N-vinylpyrrolidone), and any combination thereof.

7. A system for drilling a wellbore, the system comprises:
   a drilling fluid comprising:
      an aqueous base fluid,
      a first fluid loss control additive that is a cross-linked polymer comprising N-vinylpyrrolidone as a monomer, and
      a second fluid loss control additive that is a cross-linked copolymer comprising a first comonomer of 2-acrylamido-2-methylpropanesulfonic acid in a first comonomer concentration of at least 70 mol % of the copolymer; wherein the second fluid loss control additive additionally comprises a second comonomer comprising an N-vinyl amine-containing monomer, a terminal double bond-containing monomer, or a combination of an N-vinyl amine-containing monomer and a terminal double bond-containing monomer; wherein the second comonomer is present in a total second comonomer concentration of 30 mol % or less of the copolymer;

a zinc brine configured to be introduced into the wellbore after the drilling fluid is introduced into the wellbore;

mixing equipment configured to mix the aqueous base fluid, the first fluid loss control additive, and the second fluid loss control additive; and pumping equipment configured to pump the drilling fluid and the zinc brine in the wellbore; wherein the zinc brine is pumped after the drilling fluid, wherein the drilling fluid forms a filter cake, and wherein the filter cake is capable of controlling fluid loss of the zinc brine for at least 16 hours.

8. The system of claim 7, further comprising a drill string and a drill bit; wherein the drilling fluid is pumped through the drill string and the drill bit.

9. The system of claim 7, wherein the first fluid loss control additive is a homopolymer of cross-linked polyvinylpyrrolidone.

10. The system of claim 7, wherein the second comonomer of the second fluid loss control additive is selected from the group consisting of N-vinylpyrrolidone, N-vinylamides, acrylamide, methacrylamide, N-substituted acrylamides, N-substituted methacrylamides, acrylates, methacrylates, acrylic acid, methacrylic acid, N-allylamides, vinyl alcohol, vinyl ethers, vinyl esters, allyl alcohol, allyl ethers, allyl esters, vinylpyridine, vinyl sulfonates, allyl sulfonates, vinylimidazole, allylimidazole, allylamine, diallylamine, allyltrimethylammonium halide, diallyldimethylammonium halide, or any combination of comonomers.

\* \* \* \* \*